(12) United States Patent
Hong

(10) Patent No.: US 9,570,911 B2
(45) Date of Patent: Feb. 14, 2017

(54) APPARATUS FOR CONTROLLING POWER SUPPLY

(71) Applicant: LSIS CO., LTD., Anyang-si, Gyeonggi-do (KR)

(72) Inventor: Gwon Hwan Hong, Cheongju-si (KR)

(73) Assignee: LSIS CO., LTD., Anyang-si (KR)

(*) Notice: Subject to any disclaimer, the term of this patent is extended or adjusted under 35 U.S.C. 154(b) by 0 days.

(21) Appl. No.: 14/660,763

(22) Filed: Mar. 17, 2015

(65) Prior Publication Data
US 2015/0323970 A1    Nov. 12, 2015

(30) Foreign Application Priority Data

May 8, 2014  (KR) .................. 10-2014-0054994

(51) Int. Cl.
| | |
|---|---|
| G06F 1/26 | (2006.01) |
| G06F 1/32 | (2006.01) |
| H02J 3/32 | (2006.01) |
| H02J 3/14 | (2006.01) |
| H02J 7/00 | (2006.01) |
| H02J 7/02 | (2016.01) |

(52) U.S. Cl.
CPC ............... *H02J 3/32* (2013.01); *G06F 1/266* (2013.01); *G06F 1/3287* (2013.01); *H02J 3/14* (2013.01); *H02J 7/0004* (2013.01); *H02J 7/0052* (2013.01); *H02J 7/02* (2013.01); *H02J 2003/143* (2013.01); *Y02B 70/3225* (2013.01); *Y02B 70/3266* (2013.01); *Y04S 20/222* (2013.01); *Y04S 20/224* (2013.01); *Y04S 20/242* (2013.01)

(58) Field of Classification Search
CPC .......... G06F 1/3287; G06F 1/26; G06F 1/266; H02J 7/02; H02J 7/0004; H02J 7/0027

USPC .......................... 713/300, 310, 340
See application file for complete search history.

(56) References Cited

U.S. PATENT DOCUMENTS

2013/0169220 A1*  7/2013  Karner .............. B60L 11/184
                                                              320/108

FOREIGN PATENT DOCUMENTS

| JP | 2001008385 | 1/2001 |
|---|---|---|
| JP | 2001204138 | 7/2001 |
| JP | 2011-151896 | 8/2011 |

(Continued)

OTHER PUBLICATIONS

Japan Patent Office Application Serial No. 2015-075959, Office Action dated Apr. 5, 2016, 2 pages.

(Continued)

*Primary Examiner* — Michael J Brown
(74) *Attorney, Agent, or Firm* — Lee, Hong, Degerman, Kang & Waimey

(57) ABSTRACT

This specification relates to a power supply control apparatus. In order to solve problems of a power supply control only with respect to a preset time slot and difficulties in power supply to a plurality of consumers and metering of power supplied, which are the drawbacks of the related art electronic power meter, the power supply control apparatus can store or supply power according to a comparison result between a preset reference and a real-time pricing rate. Accordingly, electric charges, which are decided according to an amount of power used and reflect real-time rates thereto, can be saved and an appropriate power supply and an appropriate power reception of a consumer according to the real-time pricing rate can be allowed.

8 Claims, 6 Drawing Sheets

(56) References Cited

FOREIGN PATENT DOCUMENTS

| | | |
|---|---|---|
| JP | 2013-143815 | 7/2013 |
| JP | 2014042452 | 3/2014 |
| WO | 2011/096441 | 8/2011 |

OTHER PUBLICATIONS

Japan Patent Office Application Serial No. 2015-075959, Office Action dated Oct. 4, 2016, 2 pages.

\* cited by examiner

APPARATUS FOR CONTROLLING POWER SUPPLY

CROSS-REFERENCE TO RELATED APPLICATION

Pursuant to 35 U.S.C. §119(a), this application claims the benefit of earlier filing date and right of priority to Korean Application No. 10-2014-0054994, filed on May 8, 2014, the contents of which is incorporated by reference herein in its entirety.

BACKGROUND OF THE INVENTION

1. Field of the Invention

This specification relates to an apparatus for controlling power supply, and more particularly, an apparatus for controlling power supply, capable of controlling power storage or power supply according to electric charges varied in real time.

2. Background of the Invention

FIG. 1 is a configuration view of a late-night electronic power meter according to the related art.

FIG. 2 is a view illustrating a process of controlling the related art late-night electronic power meter.

As illustrated in FIG. 1, a late-night electronic power meter according to the related art supplies power to many products, such as a heater or boiler, causing a great power consumption, using a late-night time slot, for which a relatively cheap rate is required, taking into account a progressive utility rate. (In this document, power may mean electric power or electricity.) The late-night electronic power meter controls supplied power according to sequential steps as illustrated in FIG. 2. Instead of supplying power directly to a load of a household, the power meter transmits a contact signal to a time switch according to a preset late-night time slot, so as to supply power to the household during the late-night time slot and block (cut off) power supply during the other time slots. The electronic power meter also has a metering function on the time slot basis and a function of inputting, changing and applying a time slot and various settings through data communication with an external communication device.

The late-night power meter according to the related art cannot be applied to real-time pricing because it can turn on a switch only for a preset time slot. Also, one meter enables measurement (metering) only for a load of a single household, which results in a slight limitation of an application range of a system. Specifically, at a place, such as multi-housing, at which a power supply facility is shared, it is disadvantageously impossible to recognize which household consumes what quantity of power supplied. Hence, for reasonable electric charges with respect to each household, the electric power meter has to be installed individually at multiple households. In addition, since power supply and power cutoff are carried out only according to preset time slots, other flexible conditions cannot be handled. Also, an adjustment of the time slot, if desired, is not fast carried out. The late-night electric power meter according to the related art thus has many limitations in use.

SUMMARY OF THE INVENTION

Therefore, to solve a power supply control only during a preset time slot, and troubles in power supply to and metering for a plurality of consumers, all of which are drawbacks of the related art electronic power meter, an aspect of the detailed description is to provide an apparatus for controlling power supply, which is capable of storing or supplying power according to a comparison result between a preset reference and a real-time pricing rate so as to enable a power control reflecting a real-time rate variation.

To achieve these and other advantages and in accordance with the purpose of this specification, as embodied and broadly described herein, there is provided a power supply control apparatus including a connection unit that is connected to an external power source supplying power and a charging unit charged with power, a distribution unit that is configured to distribute the power supplied from the external power source to a consumer, and a controller that is configured to control the power supplied from the external power source, wherein the controller may compare a preset control reference with real-time rate information and control power such that a power exchange with the charging unit or a power distribution to the consumer is carried out based on the comparison result.

In one embodiment disclosed herein, the charging unit may be charged with power transferred through the connection unit, and the charged power may be dischargeable to be supplied to the power supply control apparatus.

In one embodiment disclosed herein, the distribution unit may meter the amount of power used by the consumer on the basis of the power distributed to the consumer.

In one embodiment disclosed herein, the distribution unit may perform communication with the controller to transfer the metering data for the amount of power used to the controller.

In one embodiment disclosed herein, the preset control reference may be a reference for controlling power according to electric charges.

In one embodiment disclosed herein, the controller may control the power exchange and the power distribution on the basis of a time slot.

In one embodiment disclosed herein, the controller may meter the power supplied from the external power source and the power controlled by the power exchange and the power distribution, receive metering data for an amount of power used by the consumer from the distribution unit, and calculate electric charges according to the amount of power used on the basis of the metering data.

In one embodiment disclosed herein, the controller may display the metering result on an external screen.

In one embodiment disclosed herein, when the real-time rate information is lower than or equal to the preset control reference, the controller may control the power supplied from the external power source to be charged in the charging unit. Also, when the real-time rate information is higher than the preset control reference, the controller may control the power supplied from the external power source to be distributed to the consumer.

In one embodiment disclosed herein, when the real-time rate information is higher than or equal to the preset control reference, the controller may control the power charged in the charging unit to be supplied to the consumer.

In one embodiment disclosed herein, the controller may control the power charged in the charging unit to be supplied when the power supply from the external power source is stopped.

In one embodiment disclosed herein, when the power charged in the charging unit is to be supplied due to the stop of the power supply from the external power source, the controller may control the power supplied from the charging unit to be supplied to the consumer.

A power supply control apparatus disclosed herein may have an effect of enabling a power control reflecting real-time pricing rates, by controlling power according to a comparison result between a preset reference and real-time rates.

The power supply control apparatus disclosed herein may have an effect of saving electric charges decided according to an amount of power used, which results from a power control reflecting real-time electric charges.

The power supply control apparatus disclosed herein may allow for a power control according to a comparison result between a preset reference and real-time rate, so as to enable an appropriate power supply according to the real-time rate and an appropriate power supply to consumers.

The power supply control apparatus disclosed herein may allow for a power exchange with a charging unit and a power distribution to consumers according to a comparison result between a preset reference and a real-time rate, so as to enable maintenance of a supply ratio and an operation ratio of a power supply source and simultaneously enable flexible power charging and power distribution according to real-time pricing.

The power supply control apparatus disclosed herein may control power charged in a charging unit to be supplied according to real-time rates, so as to enable efficient use of the charged power and power which is being supplied.

The power supply control apparatus disclosed herein may control power charged in a charging unit to be supplied according to real-time rates, so as to enable an appropriate reaction when the real-time rate or an amount of power used by consumer increases.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
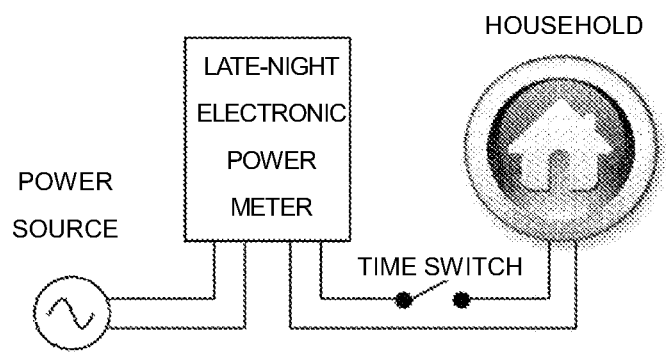
FIG. 1 is a view illustrating a configuration of a late-night electronic power meter according to the related art.
Figure 2:
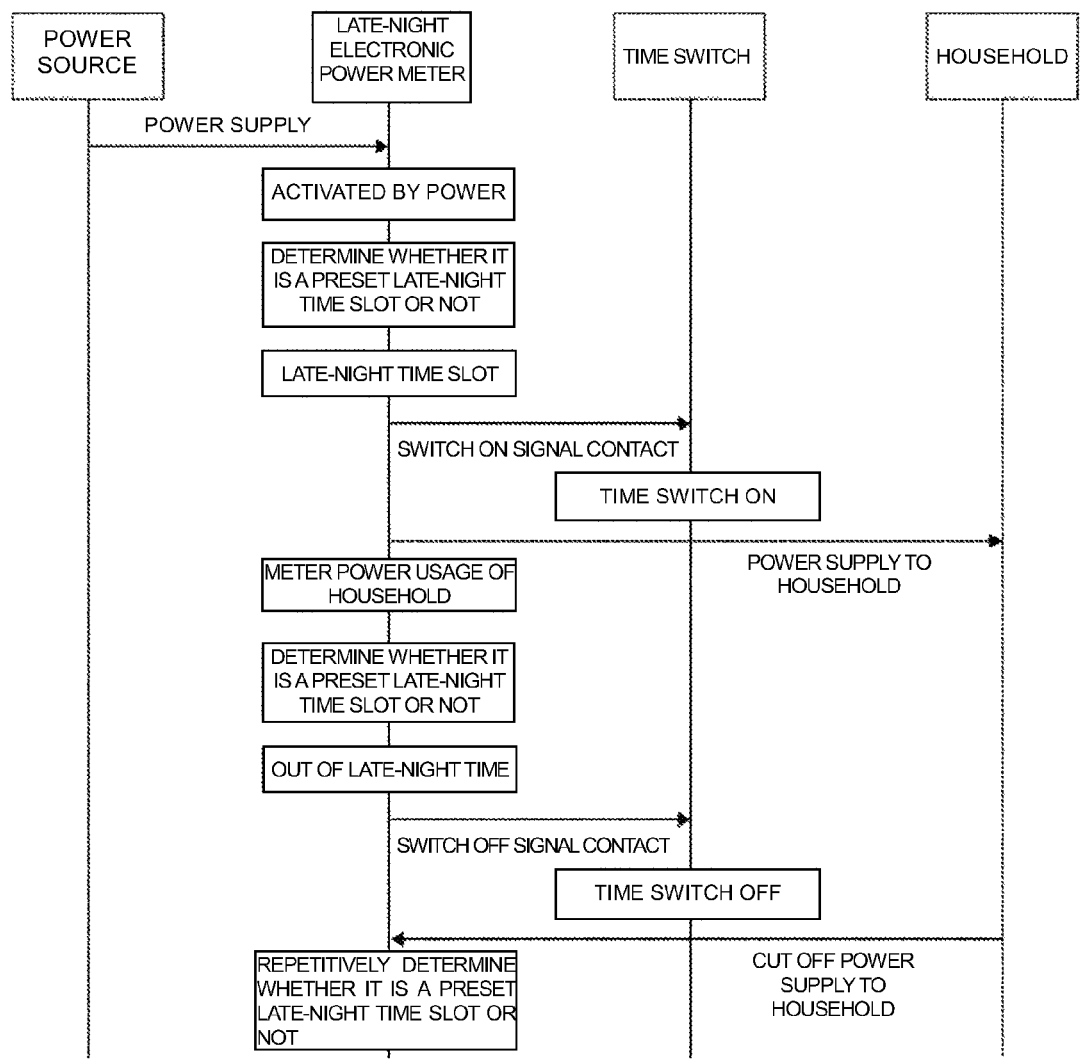
FIG. 2 is a view illustrating sequential steps of a control process of the late-night electronic power meter according to the related art.

The invention described in this specification may be applied to a power supply control apparatus. However, the technology disclosed in this specification may not be limited to this, but also usefully applicable to any of the conventional power supply control apparatuses, power supply control systems, electric power system control apparatuses, real-time electric power system control apparatuses, meters including a power meter, meter reading devices, electric power distribution systems and facilities, maximum demand power control apparatuses and systems which control power supply according to a real-time pricing rate and a load of a consumer, demand response control apparatuses and systems, and the like, and specifically, effectively applied to a late-night electronic power meter for supplying power on the time slot basis.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Hereinafter, description will be given of a power supply control apparatus disclosed herein, with reference to FIGS. 3 and 4.

Figure 3:
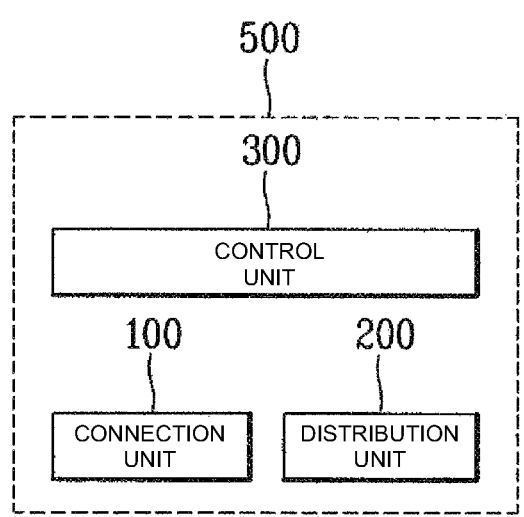
FIG. 3 is a view illustrating a configuration of an apparatus for controlling power supply disclosed herein.

FIG. 3 is a view illustrating a configuration of a power supply control apparatus disclosed herein.

Figure 4:
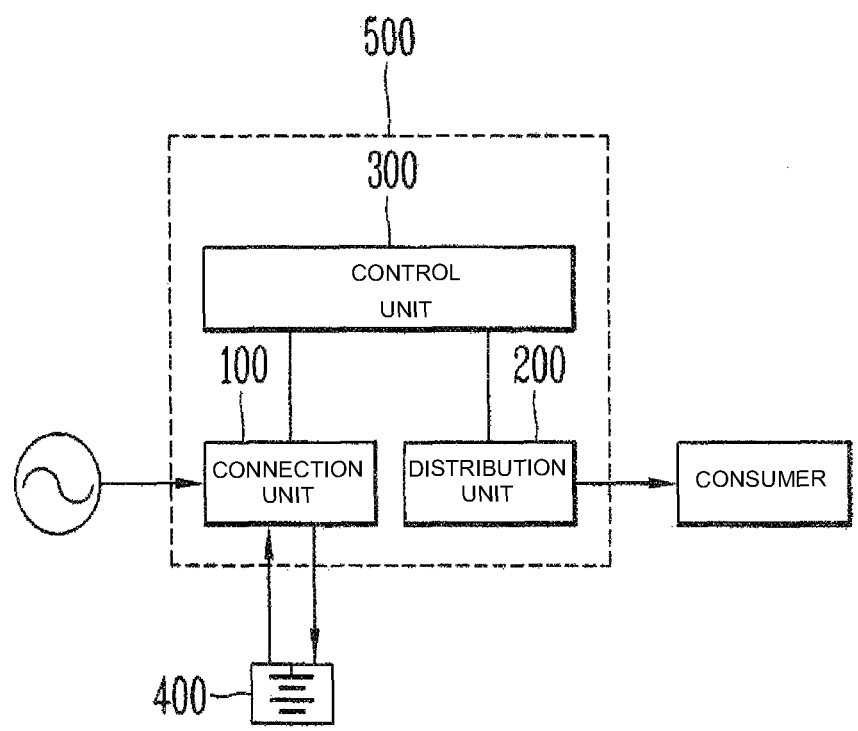
FIG. 4 is a view illustrating a detailed configuration of the power supply control apparatus disclosed herein.

FIG. 4 is a view illustrating a detailed configuration of the power supply control apparatus disclosed herein.

As illustrated in FIG. 3, the power supply control apparatus (hereinafter, referred to as a control apparatus) 500 includes a connection unit 100, a distribution unit 200, and a controller 300.

The control apparatus 500 may refer to an apparatus which performs power supply and power measurement (or metering).

The control apparatus 500 may refer to one of a power meter, a meter, and a meter reading device, which meters an amount of power supplied and an amount of power used.

The control apparatus 500 may be included in the power meter, the meter and the meter reading device.

The connection unit 100 may be a portion through which the control apparatus 500 and an external device and system are connected with each other.

The connection unit 100 may include a plurality of switches.

The connection unit 100 may be connected to the external device and a system through the plurality of switches.

The distribution unit 200 may be a portion in which electric power is distributed.

The distribution unit 200 may refer to one of a distributing board, a distributor, and the like, which distribute power.

The distribution unit 200 may be configured as an internal component included in the control apparatus 500.

The distribution unit 200 may also be configured as an external component, separately provided at the outside of the control apparatus 500.

That is, the distribution unit 200 may be configured to be separated from the control apparatus 500.

The controller 300 may refer to a central processing unit which controls power supply and power metering of the control apparatus 500.

The controller 300 may be configured as a module provided in the control apparatus 500.

The controller 300 may control the connection unit 100 and the distribution unit 200.

A detailed configuration of the control apparatus 500 may be understood as illustrated in FIG. 4.

The connection unit 100 may be connected to an external power source supplying power, and a charging unit 400 in which power is stored (or charged).

The external power source may refer to a system which generates and supplies power.

That is, the connection unit 100 may be connected to the system so as to receive power fed from the system.

The charging unit 400 may refer to a power storage device in which power is stored or charged and from which power is discharged, if necessary.

That is, the charging unit 400 may be chargeable and dischargeable at any time.

The charging unit 400 may be connected to the control apparatus 500 through a switch included in the connection unit 100.

The charging unit 400 may perform power exchange with the control apparatus 500 through the connection unit 100.

The charging unit 400 may be connected to the control apparatus 500 through the connection unit 100, so as to receive power transferred from the control apparatus 500.

The charging unit 400 may be charged with power transferred through the connection unit 100, and discharge the charged power to be supplied to the control apparatus 500.

The distribution unit 200 may distribute power supplied from the external power source to at least one consumer.

The distribution unit 200 may be connected to the consumer and distribute the power supplied from the external power source, such that the power can be supplied to the consumer.

That is, the distribution unit 200 may be a distributor for distributing power to the consumer.

The distribution unit 200 may meter power distributed to the consumer.

The distribution unit 200 may meter an amount of power distributed to each consumer if there are a plurality of consumers.

The distribution unit 200 may meter an amount of power consumed by each consumer based on the power distributed to the consumer.

The distribution unit 200 may perform communication with the controller 300 to transfer measurement data (or metering data) for the amount of power consumed to the controller 300.

The controller 300 may then control the power supplied from the external power source. Here, the controller 300 may compare a preset control reference with real-time rate information, and control power such that the power exchange with the charging unit 400 or the power distribution to the consumer can be executed based on the comparison result. Here, the real-time rate information may be time slot-based electric charge information.

The controller 300 may perform communication with a central server, which manages a power supply of the external power source, and the distribution unit 200.

The controller 300 may perform communication with the central server to receive the real-time rate information from the central server.

The preset control reference may be a reference for controlling power according to electric charges. Here, the electric charges may be electric power charges.

For example, in case where a control reference is electric charges of 150 [₩/KWH], when the electric charges are 150 [₩/KWH] or less, power distribution to the consumer may be executed. When the electric charges exceed 150 [₩/KWH], the power distribution to the consumer may not be executed. That is, the controller 300 may control the power exchange with the charging unit 400 or the power distribution to the consumer according to the electric charges.

The controller 300 may control the power exchange with the charging unit 400 or the power distribution to the consumer on the basis of a time slot.

That is, the controller 300 may control the power exchange and the power distribution on the basis of the time slot.

For example, the controller 300 may control power such that the power distribution may be executed during a time slot [06:00~24:00] and the power exchange is executed during a time slot [24:00~06:00].

The controller 300 may meter (or measure) power supplied from the external power source and power controlled according to the power exchange and the power distribution, and receive metering data for an amount of power consumed by the consumer from the distribution unit 200, thereby calculating electric charges according to the amount of power consumed on the basis of the metering data.

That is, the controller 300 may calculating the electric charges according to the power supplied from the external power source, the power charged in the charging unit 400, the power distributed to the consumer, and the amount of power consumed, thereby executing the metering function of the control apparatus 500.

The controller 300 may display the metering result on an external screen.

That is, the controller 300 may also perform a function of displaying the metering result of the control apparatus 500.

The controller 300 may control the power supplied from the external power source to be charged in the charging unit 400 when the real-time rate information is lower than or equal to the preset control reference.

That is, when the real-time rate information is below a control reference (charges) which is preset for allowing the power exchange and the power distribution, it may correspond to a case where electric charges which are to be paid for according to the amount of power consumed are not more expensive than the reference value. Accordingly, the controller 300 may control the power supplied from the external power source to be charged in the charging unit 400.

In this instance, the controller 300 may control the power to be charged in the charging unit 400 as soon as controlling the power to be distributed to the consumer.

When the real-time rate information is higher than the preset control reference, the controller 300 may control the power supplied from the external power source to be distributed to the consumer.

That is, when the real-time rate information exceeds the control reference (charge) which is preset for allowing the power exchange and the power distribution, it may correspond to a case where electric charges which are to be paid for according to the amount of power consumed are more expensive than the reference value. Accordingly, the controller 300 may control the power supplied from the external power source to be distributed to the consumer.

In this instance, the controller 300 may stop the power exchange and then control the power to be distributed to the consumer.

Here, the controller 300 may control the power exchange and the power distribution to be stopped according to a degree that the real-time rate information exceeds the preset control reference.

The controller 300 may also control the power charged in the charging unit 400 to be supplied to the consumer when the real-time rate information is higher than the preset control reference.

That is, when the real-time rate information exceeds the control reference (charge) which is preset for allowing the power exchange and the power distribution, it may correspond to a case where electric charges which are to be paid for according to the amount of power consumed are more expensive than the reference value. Accordingly, the controller 300 may control the power charged in the charging unit 400 to be distributed to the consumer.

In this instance, with the power charged in the charging unit 400 being distributed to the consumer, the amount of power supplied from the external power source may be reduced, thereby saving the electric charges.

When the amount of power consumed by the consumer increases, the controller 300 may also control the power charged in the charging unit 400 to be supplied to the consumer.

That is, when it becomes difficult to execute the power distribution to the consumer only by using the power supplied from the external power source, due to the increased amount of power consumed by the consumer, the controller 300 may control the power charged in the charging unit 400 to be distributed to the consumer.

When the power supply from the external power source is stopped, the controller 300 may control the power charged in the charging unit 400 to be supplied.

That is, when the power supply from the external power source is disabled due to an occurrence of abnormality in the external power source, the controller 300 may control the power charged in the charging unit 400 to be supplied.

When receiving power supplied from the charging unit 400, the controller 300 may control the connection unit 100 connected to the charging unit 400 so as to receive the power supplied from the charging unit 400.

When the power charged in the charging unit 400 is supplied due to the stopped power supply from the external power source, the controller 300 may control the power supplied from the charging unit 400 to be supplied to the consumer.

That is, to maintain the power distribution to the consumer, the controller 30 may control the power received from the charging unit 400 to be supplied to the consumer, thereby controlling the power distribution.

Hereinafter, a detailed embodiment of the control apparatus 500 will be described with reference to FIGS. 5 and 6.

Figure 5:
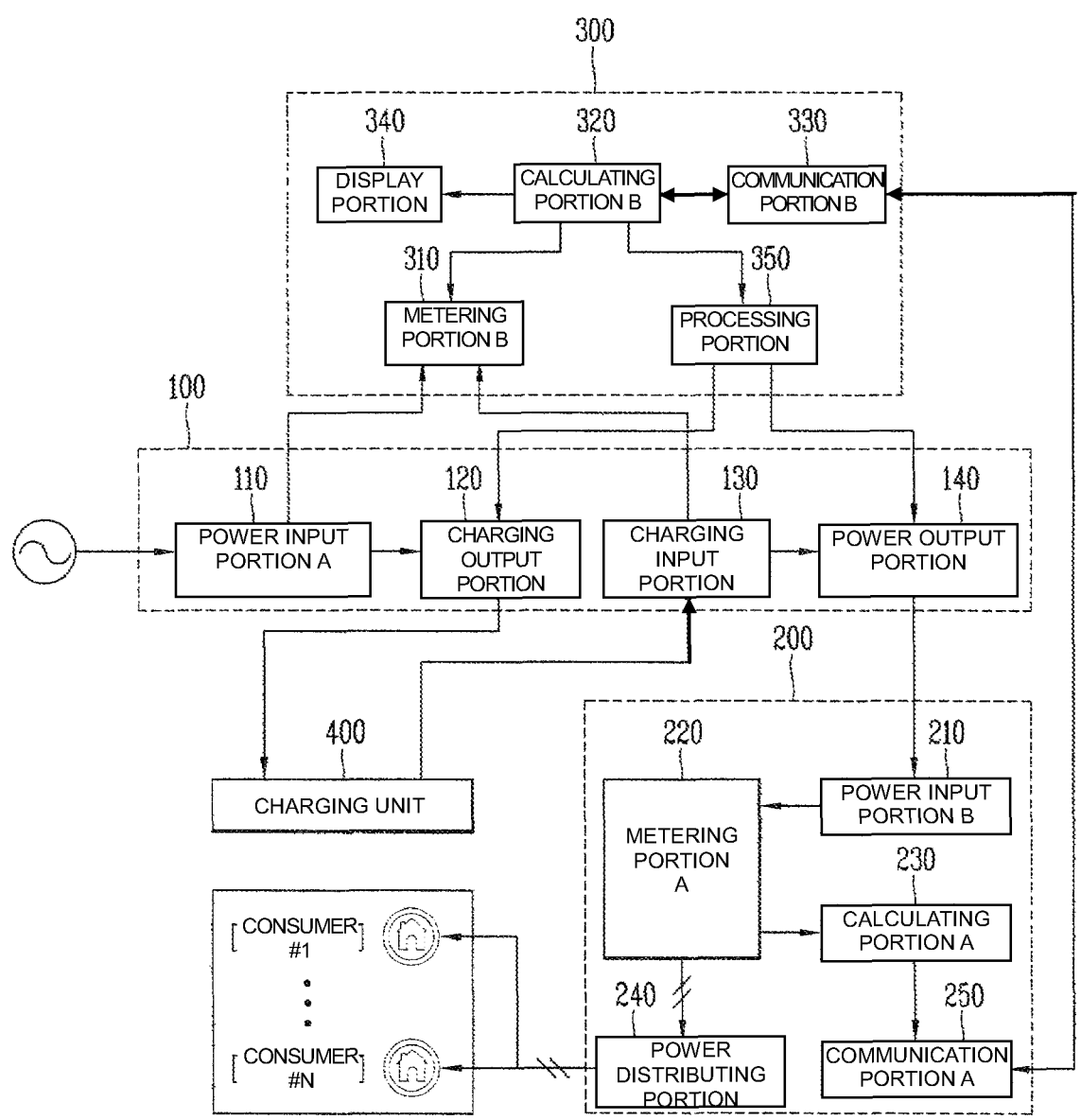
FIG. 5 is a view illustrating a configuration according to an embodiment of a power supply control apparatus disclosed herein.

FIG. 5 is a view illustrating a configuration according to an embodiment of a power supply control apparatus disclosed herein.

Figure 6:
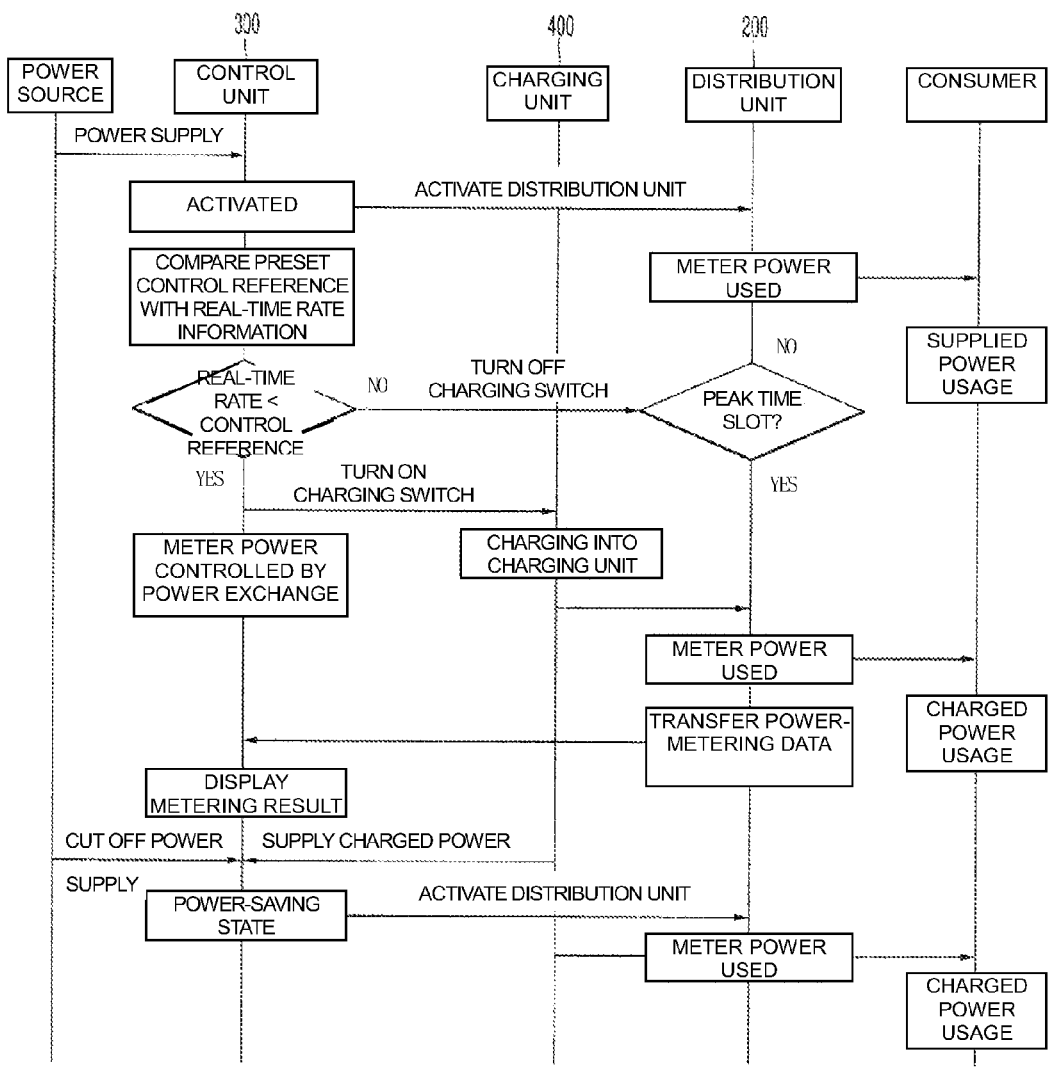
FIG. 6 is a view illustrating sequential steps of a control process according to an embodiment of a power supply control apparatus disclosed herein.

FIG. 6 is a view illustrating sequential steps of a control process according to an embodiment of a power supply control apparatus disclosed herein.

The control apparatus 500 may be implemented into the form as illustrated in FIG. 5.

The connection unit 100 may include a power input portion A 110, a charging output portion 120, a charging input portion 130, and a power output portion 140.

The distribution unit 200 may include a power input portion B 210, a metering portion A 220, a calculating portion A 230, a power distributing portion 240, and a communication portion A 250.

The controller 300 may include a metering portion B 310, a calculating portion A 320, a communication portion B 330, a display portion 340 and a processing portion 350.

The power input portion A 110 may be a connection portion through which power is supplied from the external power source.

The charging output portion 120 may be a connection portion, which is connected to the charging unit 400 to charge power therein or disconnected from the charging unit 400 to stop charging therein, in a manner of changing a switch contact according to a control processing by the processing portion 350 with respect to a comparison result between the preset reference and the real-time rate information by the calculating portion B 320.

The charging input portion 130 may be a connection portion, which is connected to the charging unit 400 such that power charged in the charging unit 400 can be supplied to the consumers, in a manner of changing a switch contact according to a control processing by the processing portion 350 with respect to the comparison result between the preset reference and the real-time rate information by the calculating portion B 320.

The power output portion 140 may be an output connection portion, through which the power supplied from the external power source and the charging unit 400 is transferred to the distribution unit 200 or at which such power is blocked from being transferred to the distribution unit 200 according to the control of the controller 300.

The power input unit B 210 may be an input connection portion into which power is supplied through the power output portion 140 of the connection unit 100.

The metering portion A 220 may be a portion which meters and databases power supplied through the power input portion B 210.

The calculating portion A 230 may be a portion in which the metered data (or metering data) by the metering portion A 220 is calculated and stored such that the metered data can be transferred to the communication portion 330 through the communication portion A 250.

The power distributing portion 240 may be an output connection portion in which power is distributed to be supplied to at least one consumer.

The communication portion A 250 may be a portion which performs communication with the communication portion B 330 such that the metered data transferred from the calculating portion 230 can be transferred to the communication portion 330.

The metering portion B 310 may be a portion by which power which is input and output through the connection unit 100 is metered and databased.

The calculating portion B 320 may be a portion which performs calculation and determination for every function of the controller 300, such as the metering portion B 310, the communication portion B 330, the display portion 340 and the processing portion 350, and transfers the calculation and determination results to the metering portion B 310, the communication portion B 330, the display portion 340 and the processing portion 350.

The communication portion B 330 may be a portion which performs communications with the central server and the communication portion A 250, so as to receive the preset control reference parameter and the real-time rate information from the central server, and the metered data from the communication portion A 250.

The display portion 340 may be a portion which is configured as a display device to visually output the metered data in the control apparatus 500.

The processing portion 350 may be a portion which performs the control of the connection unit 100 connected to the external power source and the charging unit 400, so as to allow for the power exchange and the power distribution according to the calculation and determination result of the calculating portion B 320.

The constituting elements and their names are merely illustrative for the sake of explanation of the detailed embodiment. The control apparatus 500 may also be implemented into other forms, in addition to the aforementioned configuration, and also defined with different names.

The control apparatus 500 may perform the power control through the process as illustrated in FIG. 6.

With regard to the process illustrated in FIG. 6, when power is supplied to the control apparatus 500, the control apparatus 500 may be turned on and thus the distribution unit 200 may be activated. Afterwards, the calculating portion B 320 may determine a chargeable or non-chargeable time slot of the charging unit 400 by comparing the preset control reference with the real-time rate information.

When it is determined as the chargeable time slot of the charging unit 400, the processing portion 350 may be activated to control a charging switch connected to the charging unit 400 to be switched on. The processing portion 350 may then control a current or voltage to flow along the charging output portion 120. Accordingly, the charging unit 400 may be charged with power (electricity).

The metering portion B 310 may meter the power charged in the charging unit 400 and transfer the metered data to the calculating portion B 320.

The power charged in the charging unit 400 may be transferred to the distribution unit 200 through the charging input portion 130. The power transferred to the distribution unit 200 may then be distributed to the consumers.

The distribution unit 200 may meter an amount of power used (consumed) by each consumer as soon as distributing the power to each consumer.

Data which has been metered for the amount of power used may be transferred to the controller 300 through communication between the communication portion A 250 of the distribution unit 200 and the communication portion B 330 of the controller 300. The metered data may thusly be displayed on the display portion 340 in various manners according to a command of the calculating portion B 320.

When it is determined as the non-chargeable time slot of the charging unit 400, the charging switch may be switched off to close a terminal of the charging output portion 120, to prevent charging.

In this instance, when the time slot is determined as a time slot requiring for high electric charges according to the real-time rate information, it is more efficient to supply both of the power supplied from the external power source and the power charged in the charging unit 400 to the consumers than to supply only the power supplied from the external power source to the consumers. Therefore, the power charged in the charging unit 400 may be supplied to the consumers.

When the time slot is determined as a time slot requiring for low electric charges according to the real-time rate information, the distribution unit 200 may be controlled to keep distribute the power supplied from the external power source to the consumers, while metering an amount of power used by the consumers.

Or, when the power supply from the external power source is stopped, the control apparatus 500 may be driven in a power-saving state while receiving power supplied from the charging unit 400, and the distribution unit 200 may be activated to distribute the power charged in the charging unit 400 to the consumers.

The power supply control apparatus disclosed herein may be applied to electric power supply control systems, electric power system control apparatuses, real-time electric power system control apparatuses, and the like.

The power supply control apparatus disclosed herein may be applied to meters including a power meter, meter reading devices, power distribution devices, distributors, distribution facilities, and the like.

The power supply control apparatus disclosed herein may be applied to maximum demand power control apparatuses and systems which control power supply according to a real-time pricing rate and a load of a consumer, demand response control apparatuses and systems, and the like.

The power supply control apparatus disclosed herein may be usefully applied to late-night electric power meters which supply power on the basis of a time slot.

The power supply control apparatus disclosed herein may be usefully applied to real-time load control apparatuses which supply power according to real-time electric charges.

The power supply control apparatus disclosed herein may have an effect of saving electric charges decided according to an amount of power used, which results from a power control reflecting real-time electric charges.

The power supply control apparatus disclosed herein may allow for a power control according to a comparison result between a preset reference and real-time rate, so as to enable an appropriate power supply according to the real-time rate and an appropriate power supply to consumers.

The power supply control apparatus disclosed herein may allow for a power exchange with a charging unit and a power distribution to consumers according to a comparison result between a preset reference and a real-time rate, so as to enable maintenance of a supply ratio and an operation ratio of a power supply source and simultaneously enable flexible power charging and power distribution according to real-time pricing.

The power supply control apparatus disclosed herein may control power charged in a charging unit to be supplied according to real-time rates, so as to enable efficient use of the charged power and power which is being supplied.

The power supply control apparatus disclosed herein may control power charged in a charging unit to be supplied according to real-time rates, so as to enable an appropriate reaction when the real-time rate or an amount of power used by consumer increases.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A power supply control apparatus comprising:
a connection unit connected to an external power source supplying power and to a charging unit charged with power;
a distribution unit configured to distribute power supplied from the external power source to a plurality of consumers;
a controller configured to
control the power supplied from the external power source by comparing a preset control reference with real-time rate information and controlling the supplied power such that a power exchange with the charging unit or a power distribution to the plurality of consumers is performed based on a comparison result;
meter the power supplied from the external power source and the power controlled by the power exchange and the power distribution;
receive metering data related to an amount of power used by the plurality of consumers from the distribution unit;
calculate electric charges based on the metering data;
control the charging unit to be charged with the power supplied from the external power source and the external power source to supply power to the plurality of consumers when the real-time rate information is lower than or equal to the preset control reference; and
control the external power source to supply power to the plurality of consumers and the charging unit to the plurality of consumers when the real-time rate information is higher than the preset control reference,
wherein the charging unit is provided separate from each of the plurality of consumers.

2. The apparatus of claim 1, wherein:
the charging unit is charged with power transferred through the connection unit; and
the charging unit discharges the charged power for power supply control.

3. The apparatus of claim 1, wherein the distribution unit is further configured to meter an amount of power used based on power distributed to the plurality of consumers.

4. The apparatus of claim 3, wherein the distribution unit is further configured to generate the metering data and transfer the generated metering data to the controller.

5. The apparatus of claim 1, wherein the preset control reference is a reference for controlling power according to electric charges.

6. The apparatus of claim 1, wherein the controller is further configured to control the power exchange and the power distribution based on a time slot.

7. The apparatus of claim 1, wherein the controller is further configured to display a metering result on an external screen.

8. The apparatus of claim 1, wherein the controller is further configured to control the charging unit to supply charged power to the consumer when the power is not supplied from the external power source.

* * * * *